United States Patent [19]

Giberti

[11] Patent Number: 5,705,580
[45] Date of Patent: Jan. 6, 1998

[54] PROCESS FOR PREPARING BEADS OF POLYMERS HAVING AN ACRYLIC BASIS

[75] Inventor: Fabio Giberti, Paderno Dugnano, Italy

[73] Assignee: Atohaas Holding C.V., Pays-Bas, Netherlands

[21] Appl. No.: 801,462

[22] Filed: Feb. 18, 1997

[30] Foreign Application Priority Data

Feb. 19, 1996 [IT] Italy .................. MI96A0312

[51] Int. Cl.$^6$ ...................................... C08F 2/00
[52] U.S. Cl. ............................. 526/201; 525/309
[58] Field of Search ................ 526/201; 525/309

[56] References Cited

U.S. PATENT DOCUMENTS

| | | |
|---|---|---|
| 3,887,652 | 6/1975 | Carrock et al. |
| 3,943,190 | 3/1976 | Abe et al. |
| 3,976,629 | 8/1976 | Hayward et al. |
| 4,247,434 | 1/1981 | Vanderhoff et al. .......... 526/201 |
| 4,694,035 | 9/1987 | Kasai et al. .................. 526/201 |

FOREIGN PATENT DOCUMENTS

| | | |
|---|---|---|
| 0517373A | 12/1992 | European Pat. Off. |
| 0572115A | 12/1993 | European Pat. Off. |
| 0683182A | 11/1995 | European Pat. Off. |
| 0774471A | 5/1997 | European Pat. Off. |
| 1236257 | 9/1989 | Japan ............................ 526/201 |
| 81/03334 | 11/1981 | WIPO .......................... 526/201 |

*Primary Examiner*—Joseph L. Schofer
*Assistant Examiner*—N. Sarofim
*Attorney, Agent, or Firm*—Watson Cole Stevens Davis, P.L.L.C.

[57] ABSTRACT

Process for preparing beads based on acrylic polymers which comprises the preparation of microbeads from 10 to 40 micron by means of a polymerization process in suspension of acrylic monomers in the presence of at least a crosslinking monomer at least bifunctional, characterized in that a second polymerization of the acrylic monomers is carried out in absence of crosslinking monomers and using as suspending phase a fraction of the suspension obtained in the preceding polymerization containing a crosslinking agent, said fraction containing an amount of microbeads comprised between 3 and 40% by weight with respect to the final polymer obtained in the second polymerization.

9 Claims, No Drawings

PROCESS FOR PREPARING BEADS OF POLYMERS HAVING AN ACRYLIC BASIS

The present invention relates to a process for preparing microbeads of polymers having a crosslinked acrylic basis and microbeads thus obtained.

More particularly the invention relates to crosslinked microbeads of acrylic polymers usable to prepare antireflection surfaces by means of extrusion processes.

It is known in the art to prepare said antireflection surfaces by using microbeads of crosslinked acrylic polymers having sizes from 10 to 40 micron, generally around 20 micron.

The industrial processes for preparing said microbeads are carried out for instance in suspension by preferably using as suspending agent polyvinylic alcohol.

The drawbacks of these processes reside in that the particles of these sizes are hardly centrifugeable, it is indeed necessary to operate also with a dilution ratio of the order of 3:1 since the viscosity of the aqueous phase containing the microbeads is very high.

It is necessary to operate at a centrifugation rate of the order of ⅕ with respect to the centrifugation of the normal beads based on acrylic polymers, for instance PMMA of 200–300 micron of average diameter, for instance commercially well known as ALTUGLAS™ of ATOHAAS.

A further drawback from the industrial point of view regards the drying of said microbeads after centrifugation.

Considering the low size of the microbeads, one is near the explosion limits wherefore it is necessary to operate in inert atmosphere.

Moreover the yield obtainable by these processes is of the order of 70% whereby ecological problems arise, the COD (Chemical Oxygen Demand) of the waste waters being of the order of 50,000 ppm.

There was therefore the need to have at one's disposal an industrial process allowing to overcome the drawbacks mentioned above and especially allowing to increase the yields and lower the COD.

It is necessary to notice indeed that the antireflection surfaces can be obtained only by using microbeads in the order of the sizes indicated above.

Also tests carried out by the Applicant have shown that if particles of 10 times higher sizes are used it is not possible to obtain antireflection surfaces.

It has now been unexpectedly and surprisingly found that it is possible to produce beads based on acrylic polymers which, utilized in extrusion, allow to obtain antireflection surfaces if a preparation process as hereinafter described is utilized.

An object of the present invention is therefore a process for preparing beads based on acrylic polymers which comprises the preparation of microbeads from 10 to 40 micron by means of a polymerization process in suspension of acrylic monomers in the presence of at least a crosslinking monomer at least bifunctional, characterized in that a second polymerization of the acrylic monomers is carried out in absence of crosslinking monomers and by using as suspending phase a fraction of the suspension obtained in the preceding polymerization containing a crosslinking agent, said fraction containing an amount of microbeads of from 3 to 40% by weight, preferably from 4.5 to 25, with respect to the final polymer obtained in the second polymerization.

It has been unexpectedly found that by operating in the conditions indicated above, beads having sizes of at least 80 microns, generally of the order of about 150–200 microns, are obtained which when are utilized in extrusion allow to obtain antireflection surfaces.

This results completely surprising since normal crosslinked beads having sizes of the order of 150–200 microns, as said above, do not allow to obtain antireflection surfaces.

A further object of the invention consists in that instead of the water as dispersing phase in the second polymerization in absence of croslinking agent, the recycling waters coming from the polymerization in supension of acrylic monomers can be used which produce beads having sizes greater than 100 microns.

In this way one contributes to lower the total COD produced in an industrial polymerization plant since, as well known, mother waters are generally sent to a treatment plant to lower the COD at the outlet.

The beads sizes according to the present invention are greater than those of the microbeads, generally from 80 to 300 microns, preferably from 140 to 250 microns, more preferably from 150 to 200 microns.

As acrylic monomers which can be used to prepare polymers having an acrylic basis according to the present invention, $C_1-C_8$ alkyl(meth)acrylates, linear or branched when possible, can be mentioned, such as for instance:

a1) one or more $C_1-C_8$ alkylacrylates or methacrylates, linear or branched when possible, such as, for instance, methyl(meth)acrylate, ethyl(meth)acrylate, propyl (meth)acrylate, isopropyl(meth)acrylate, butyl(meth) acrylate, secbutyl(meth)acrylate, ter-butyl(meth) acrylate;

b1) optionally one or more monomers soluble in water having solubility in water of at least 5 g per 100 g of water at T of 23° C. generally in amount of 60% by weight at most, preferably 50% as, for instance, acrylic, methacrylic acids, acrylamide, hydroxyethyl(meth) acrylate, hydroxypropyl(meth)acrylate;

c1) optionally another monomer in amount generally of 50% by weight at most, such as for instance, styrene, alpha-methylstyrene, (meth)acrylonitrile, n-alkyl or arylmaleimides with alkyl from 1 to 10 carbon atoms and aryl from 6 to 12 carbon atoms, butadiene, styrenesulphonic acid, N-vinylpyrolidone.

Peroxides can be used as radical initiators, such as for instance t-butylperoxy-2-ethylhexanoate, dibenzoylperoxide, lauroylperoxide, t-butylperoxydiethylacetate or unstable azocompounds such as, for instance, azodiisobutyronitrile.

As chain transfer agents can be used alkylthiols with the alkyl linear or branched by $C_3-C_{20}$, preferably $C_4-C_{12}$, such as, for instance, n-butanthiol, n-octanthiol, n-dodecanthiol, ter-dodecanthiol, cyclohexanthiol, pianthiol.

When as dispersing phase the mother waters as described above are used, those obtainable according to the polymerization processes indicated in European patent application EP 457356 can be used, herein incorporated by reference.

The processes for obtaining microbeads from 10 to 40 microns above are well known in the art and use suspending agents capable of giving microbeads of said sizes.

The polyvinylic alcohol in concentration can generally be used as suspending agent generally of at least 1.5% by weight, and up to values of about 10% by weight.

The ratio between aqueous phase and monomers in the polymerization for preparing microbeads is generally higher than 2:1, for instance 3:1.

The crosslinking agents used in the first phase of the polymerization are well known and as already said at least bifunctional, they can generally be also trifunctional or polyfunctional. They can be of acrylic type without being this however a necessary requisite.

Allylmethacrylate, divinylbenzene, glycidyldimethacrylate, ethylenglycoldimethacrylate (EGDM), tetraethylenglycoldimethacrylate (TEGDM) can for instance be mentioned.

In the second polymerization in absence of crosslinking agent the ratios between dispersing phase and monomers can be those indicated for the first polymerization or can be also lower, for instance 1.4:1.

The characterization of the beads and microbeads is carried out by determining the granulometry by means of optical methods or by sieving; the COD on the waste waters is determined according to the IRSA method "chemical oxygen demand"; after centrifugation of the beads the dry residue is determined at 160° C.

The most relevant characterization and process data are reported in Tables 2 and 1 respectively.

The following examples are given for illustrative purpose but are not limitative of the present invention.

EXAMPLE 1 (COMPARATIVE)

Preparation of Crosslinked Microbeads

The polymerization in suspension of methyl methacrylate, ethylacrylate and allyl methacrylate is carried out by using as suspending agent the polyvinylic alcohol (PVA).

245 parts by weight of deionized water at room temperature and 5 parts by weight of polyvinylic alcohol are introduced in a stirred, jacketed and pressure-resistant reactor. It is slowly heated up to 40° C. by keeping the reactor under stirring and the temperature is kept at 40° C. until the complete dissolution of the polyvinylic alcohol. The oxygen is removed by nitrogen flow. A mixture, it too deoxygenated, is then fed, which consists of: methylmethacrylate 94.75 parts by weight, ethylacrylate 4 parts by weight, allyl methacrylate 0.25 parts by weight, lauroyl peroxide 0.6 parts by weight. The reactor is hermetically sealed, it is pressurized at 100 KPa and under continuous stirring the mixture is gradually heated up to 110° C. in 120 minutes. Crosslinked microbeads (called XD in the Tables) having an average diameter of 20 microns, are obtained. The characteristics of the beads and of the mother waters are reported in Table 2.

EXAMPLE 2

Preparation of a Master Containing 7% of Crosslinked Microbeads

In the same reactor already used in example 1, and with the general operating modalities described in said example, the polymerization in suspension of methyl methacrylate and of ethylacrylate is carried out by using as suspending solution a fraction of the pulp (microbeads+aqueous phase) coming from the polymerization described in example 1. Then 188.4 parts by weight of deionized water and 26.9 parts by weight of pulp coming from example 1 are introduced in the reactor. The solution is heated to 80° C. and a mixture was then fed consisting of methyl methacrylate 96 parts by weight, ethyl acrylate 4 parts by weight, lauroyl peroxide 0.6 parts by weight, n-butanthiol 0.12 parts by weight. The reactor is hermetically sealed, pressurized at 100 KPa and under continuous stirring the mixture is gradually heated up to 110° C. in 120 minutes. The reactor is let stay at 110° C. for 15 minutes, then it is cooled. The polymer, under form of beads, is separated from the mother waters by centrifugation, washed with deionized water and dried in stove at 80° C. The characteristics of the beads and of the mother waters are reported in Table 2.

EXAMPLES 3–7

Preparation of Masters Containing Various Amounts of Microbeads

In the same reactor already utilized in example 2 and with the general operating modalities described in said example, the polymerization in suspension of methyl methacrylate and ethylacrylate is carried out by using the suspending solutions described in table 1. Therefore the amounts of deionized water and pulp indicated in table 1 are placed in the reactor.

The solution is heated to 80° C. and a mixture is then fed consisting of methyl methacrylate 96 parts by weight, ethylacrylate 4 parts by weight, lauroyl peroxide 0.6 parts by weight, n-butanthiol 0.12 parts by weight. The reactor is hermetically sealed, pressurized at 100 KPa and under continuous stirring the mixture is gradually heated up to 110° C. in 120 minutes.

The reactor is let stay at 110° C. for 15 minutes, then it is cooled. The polymer, under form of beads, is separated from the mother waters by centrifugation and dried in stove at 80° C.

The characteristics of the beads and of the mother waters are reported in Table 2.

EXAMPLE 8

Preparation of the Suspending Agent 120 parts by weight of a 40% by weight NaOH solution and 630 parts by weight of deionized water are introduced into a reactor.

250 parts by weight of 2-acrylamido-2'-methylpropansulphonic acid (AMPS) are slowly fed, then the pH is adjusted in the range 7–8 with small additions of soda or AMPS. After the solution was fluxed with nitrogen to remove the oxygen and heated to 50° C., potassium persulphate 0.075 parts by weight and sodium methabisulphite 0.025 parts by weight are added. The polymerization ends in about 60 minutes. It is then diluted with about 4000 parts by weight of deionized water obtaining a solution with a dry residue at 160° C. of 5.5% by weight and a Brookfield viscosity of 4 Pa.s, measured at 25° C.

EXAMPLE 9

Preparation Mother Waters

The polymerization in suspension of methyl methacrylate and of ethyl acrylate is carried out by using as suspending agent the homopolymer of the sodic salt of the 2-acrylamido-2-methylpropansulphonic acid obtained in example 8.

193 parts by weight of deionized water and 7 parts by weight of the solution obtained in example 8, corresponding to 0.385 parts by weight of dry product, are introduced in a stirred, jacketed and pressure-resistant reactor. The oxygen is removed by nitrogen flow and the solution is heated to 80° C. 100 parts by weight of a mixture, it too deoxygenated, are then fed, which consists of: methylmethacrylate 96 parts by weight, ethylacrylate 4 parts by weight, t-butyl peroxy-2-ethylhexanoate 0.25 parts by weight, n-butanthiol 0.12 part by weight. The reactor is hermetically sealed, it is pressurized at 100 KPa and under continuous stirring the mixture is heated gradually up to 110° C. in 120 minutes. The reactor is let stay at 110° C. for 15 minutes, then it is cooled. The polymer, under form of beads, is separated from the mother waters by centrifugation, washed with deionized water and dried in stove at 80° C. The beads have sizes of 200 microns.

The mother waters, with a dry residue at 160° C. of about 0.62% by weight, in part consisting of the suspending agent (0.2% by weight) and for the remaining fraction of other products obtained in polymerization, are joined together to be used in the subsequent polymerization proofs.

EXAMPLE 10

Preparation of a Master Containing 7% of Crosslinked Microbeads

In the same reactor already used in example 2, and with the general operating modalities described in said example, the polymerization in suspension of methyl methacrylate and of ethylacrylate is carried out by using as suspending solution a fraction of the pulp (microbeads+aqueous phase) coming from the polymerization described in example 1 and from mother waters coming from example 9. Thus 188.4 parts by weight of mother waters coming from example 9 and 27.2 parts by weight of pulp coming from example 1 are introduced in the reactor. The solution is heated to 80° C. and a mixture is then fed, which consists of methyl methacrylate 96 parts by weight, ethyl acrylate 4 parts by weight, lauroyl peroxide 0.6 parts by weight, n-butanthiol 0.12 parts by weight. The reactor is hermetically sealed, pressurized at 100 KPa and under continuous stirring the mixture is gradually heated up to 110° C. in 120 minutes. The reactor is let stay at 110° C. for 15 minutes, then it is cooled. The polymer, under form of beads, is separated from the mother waters by centrifugation, washed with deionized water and dried in stove at 80° C. The characteristics of the beads and of the mother waters are reported in Table 2.

EXAMPLE 11 (COMPARATIVE)

Preparation of Crosslinked Beads

In the same reactor already utilized in example 2, and with the general operating modalities described in said example, the polymerization in suspension of methyl methacrylate, ethylacrylate and allylmethacrylate is carried out by using as suspending solution a fraction of the mother waters coming from example 9.

200 parts by weight of mother waters coming from example 9 are therefore introduced into the reactor. The solution is heated to 80° C. and a mixture is then fed which consists of methyl methacrylate 94.75 parts by weight, ethyl acrylate 4 parts by weight, allyl methacrylate 0.25 parts by weight, lauroyl peroxide 0.6 parts by weight.

The reactor is hermetically sealed, it is pressurized at 100 KPa and under continuous stirring the mixture is gradually heated up to 110° C. in 120 minutes.

The reactor is let stay at 110° C. for 15 minutes, then it is cooled. The polymer, in form of beads, is separated from the mother waters by centrifugation, washed with deionized water and dried in stove at 80° C.

The beads have sizes of 200 microns.

EXAMPLE 12

Extrusion of Antireflection Plates

Starting from beads prepared in examples 1, 2, 9 and 11, 5 cm×10 cm plates having a depth of 2–3 mm, were extruded in order to test the antireflection properties with the compositions reported in Table 3. All the plates contain 6% by weight of crosslinked particles. The evaluation of the plates appearance is made visually.

In practice the test is carried out as follows: the plate prepared by extrusion is put on a surface which contains printed characters.

The extruded plates starting from the microbeads coming from examples 1 and 2 (plates 1 and 2) have good antireflection properties, that is they allow to exactly see the printed characters of the underlying surface as though the plates were not present.

Plate 3, extruded starting from the beads of example 9 and the beads of example 11, on the contrary does not show antireflection properties, i.e., the characters of the underlying surface appear distorted. Plate 3 has therefore no acceptable antireflection properties.

TABLE 1

Composition of the aqueous phase (per 100 parts of monomers)

| Ex. | XD in the master % by weight | deionized water parts by weight | pulp XD (coming from ex. 1) parts by weight | Water/monomers ratio weight/weight | PVA % in aqueous phase |
|---|---|---|---|---|---|
| 1 | — | 250.0 | — | 2.500 | 2.00 |
| 2 | 7 | 188.6 | 26.9 | 1.929 | 0.25 |
| 3 | 14 | 175.2 | 58.3 | 1.859 | 0.50 |
| 4 | 14 | 175.2 | 58.3 | 1.859 | 0.50 |
| 5 | 20 | 161.8 | 89.8 | 1.798 | 0.71 |
| 6 | 20 | 161.8 | 89.8 | 1.798 | 0.71 |
| 7 | 30 | 134.3 | 154.6 | 1.697 | 0.93 |

TABLE 2

Characterization

| Ex. | XD in the master (1) % by weight | Dry residue at 160° C. % by weight | Fraction >1 mm (2) % by weight | COD (3) ppm | Yield % by weight | Beads average diameter μmm |
|---|---|---|---|---|---|---|
| 1 (4) | — | 6.50 | | 57000 | 70 | 20 |
| 2 | 7 | 1.14 | 10.1 | 8010 | 98.8 | 210 |
| 3 | 14 | 0.97 | 2.1 | 7807 | 99.1 | 180 |
| 4 | 14 | 1.46 | 0.3 | 11610 | 98.5 | |
| 5 | 20 | 1.06 | 0.0 | 10960 | 99.4 | 160 |
| 6 | 20 | 1.16 | 0.0 | 10480 | 99.4 | |
| 7 | 30 | 1.89 | 0.0 | 19390 | 98.9 | 150 |
| 10 | 7 | 1.30 | 8.1 | 9300 | 98.1 | 190 |

(1) based on the master (6% means an amount of XD slurry containing 60 parts by weight of beads and emulsions, diluted and used to polymerize 940 parts by weight of monomers in the second reaction);
(2) waste;
(3) COD of the mother waters;
(4) XD standard process

TABLE 3

Preparation of antireflection plates

| Plate | Beads example 9 parts by weight | Beads example | parts by weight |
|---|---|---|---|
| 1 | 94.0 | 1 | 6.0 |
| 2 | 14.3 | 2 | 85.7 |
| 3 | 94.0 | 11 | 6.0 |

I claim:

1. Process for preparing beads based on acrylic polymers which comprises the preparation of microbeads from 10 to 40 micron by means of a polymerization process in suspension of acrylic monomers in the presence of at least a crosslinking monomer at least bifunctional, characterized in that a second polymerization of the acrylic monomers is carried out in absence of crosslinking monomers and by using as suspending phase a fraction of the suspension obtained in the preceding polymerization containing a crosslinking agent, said fraction containing an amount of microbeads comprised between 3 and 40% by weight with respect to the final polymer obtained in the second polymerization.

2. Process according to claim 1 wherein a fraction of the suspension obtained in the preceding polymerization containing a crosslinking agent is used as suspending agent, said fraction containing an amount of microbeads of from 4.5 to 25.

3. Process according to claim 1 wherein waste waters are utilized as dispersing phase instead of water in the second polymerization in absence of crosslinking agent, optionally diluted with water, coming from the polymerization in suspension of acrylic monomers which produce beads of sizes greater than 100 microns.

4. Process according to claim 1 wherein the acrylic monomers for preparing polymers having an acrylic basis are $C_1$–$C_8$ alkyl(meth)acrylates linear or branched when possible, selected from a1) methyl(meth)acrylate, ethyl(meth)acrylate, propyl(meth)acrylate, isopropyl(meth)acrylate, butylacrylate, secbutyl(meth)acrylate, ter-butyl(meth)acrylate;

b1) optionally one or more monomers soluble in water having solubility in water of at least 5 g per 100 g of water at T of 23° C. in amount of 50% by weight, selected from acrylic, methacrylic acids, acrylamide, hydroxyethyl(meth)acrylate, hydroxypropyl(meth)acrylate;

c1) optionally another monomer in amount of 50% by weight at most, selected from styrene, alphamethylstyrene, (meth)acrylonitrile, n-alkyl- or arylmaleimides with alkyl from 1 to 10 carbon atoms and aryl from 6 to 12 carbon atoms, butadiene, styrenesulphonic acid, N-vinylpyrolidone.

5. Process according to claim 1 wherein the polyvinylic alcohol is used as suspending agent in the first polymerization in the presence of crosslinking agent, in concentration generally of at least 1.5% by weight and up to values of about 10% by weight.

6. Process according to claim 1 wherein the ratio between aqueous phase and monomers in the polymerization in the presence of crosslinking agent for the preparation of microbeads is higher than 2:1.

7. Process according to claim 1, wherein the ratio between aqueous phase and monomers in the polymerization in absence of crosslinking agent is 1.4:1 or higher.

8. Beads based on acrylic polymers having sizes from 80 to 300 microns obtained by the process according to claim 1.

9. Beads based on acrylic polymers according to claim 8 having sizes between 140 and 250 microns.

* * * * *